(12) United States Patent
Chang et al.

(10) Patent No.: US 7,652,460 B2
(45) Date of Patent: Jan. 26, 2010

(54) DIGITAL COMPENSATOR DESIGN METHOD AND DIGITAL COMPENSATOR FOR A SWITCHING MODE POWER SUPPLY

(75) Inventors: Wei-Hsu Chang, Jubei (TW); Dan Chen, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 266 days.

(21) Appl. No.: 12/005,295

(22) Filed: Dec. 27, 2007

(65) Prior Publication Data

US 2008/0157737 A1    Jul. 3, 2008

(30) Foreign Application Priority Data

Jan. 3, 2007    (TW) .............................. 96100247 A (51) Int. Cl.
*G05F 1/40*    (2006.01)
*G05F 1/613*    (2006.01)

(52) U.S. Cl. .................. 323/283; 323/224; 323/271
(58) Field of Classification Search ......... 323/222–225, 323/268, 271, 282, 283, 285, 286, 349–351
See application file for complete search history.

(56) References Cited

U.S. PATENT DOCUMENTS

| | | | |
|---|---|---|---|
| 6,448,745 B1 * | 9/2002 | Killat | 323/222 |
| 7,394,236 B2 * | 7/2008 | Chapuis et al. | 323/283 |
| 7,548,048 B2 * | 6/2009 | Chang | 323/283 |
| 2008/0284397 A1 * | 11/2008 | Chang | 323/283 |

* cited by examiner

*Primary Examiner*—Matthew V Nguyen
(74) *Attorney, Agent, or Firm*—Rosenberg, Klein & Lee (57) ABSTRACT

A method for designing a digital compensator for a switching mode power supply is provided such that the digital compensator has complex conjugated zero pair or a right hand pole to eliminate the complex conjugated pole pair or right hand zero in the transfer function of the control-to-output voltage of the switching mode power supply.

6 Claims, 10 Drawing Sheets

Prior Art

Fig. 5

Prior Art

DIGITAL COMPENSATOR DESIGN METHOD AND DIGITAL COMPENSATOR FOR A SWITCHING MODE POWER SUPPLY

FIELD OF THE INVENTION

The present invention is related generally to a switching mode power supply and, more particularly, to a digital compensator for a switching mode power supply.

BACKGROUND OF THE INVENTION

Figure 1:
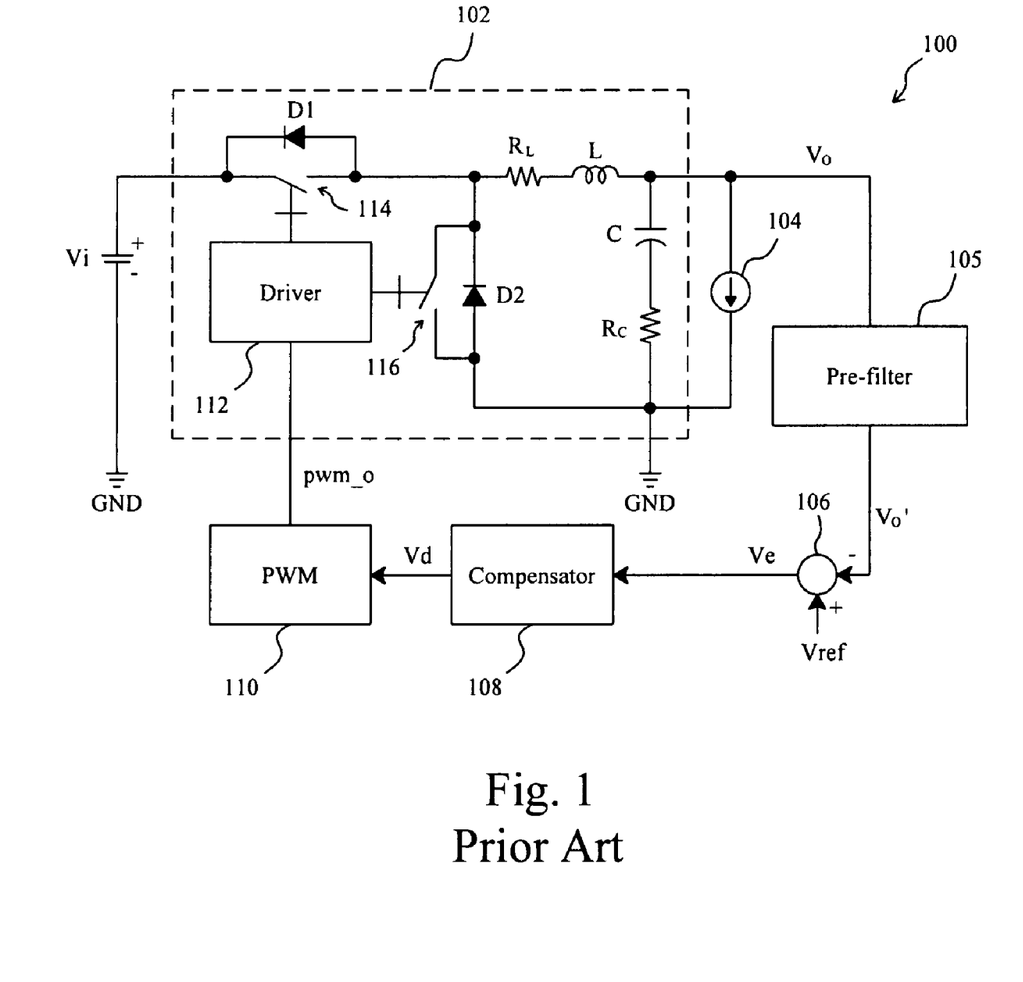
FIG. 1 is a schematic drawing showing a conventional switching mode power supply.

Switching mode power supplies are widely used in various electronic devices for providing stable voltages; however, non-ideal effects resulted from the switches, inductor and output capacitor in a switching mode power supply may cause the output voltage of the switching mode power supply unstable, and thus a compensator is needed to compensate these non-ideal effects. FIG. 1 shows a conventional switching mode power supply 100, which includes an output stage 102 to convert an input voltage Vi to an output voltage Vo for a load 104, a pre-filter 105 to filter the output voltage Vo to produce a voltage Vo', an error amplifier 106 to compare the voltage Vo' with a reference voltage Vref to generate an error signal Ve, a compensator 108 to compensate the error signal Ve to generate a signal Vd, and a pulse width modulator to generate a pulse width modulation (PWM) signal pwm_o according to the signal Vd to drive the output stage 102. In the output stage 102, a driver 112 is used to switch a pair of switches 114 and 116 connected in series between the power input Vi and ground GND according to the PWM signal pwm_o, in order to convert the input voltage Vi to the output voltage Vo.

Figure 2:
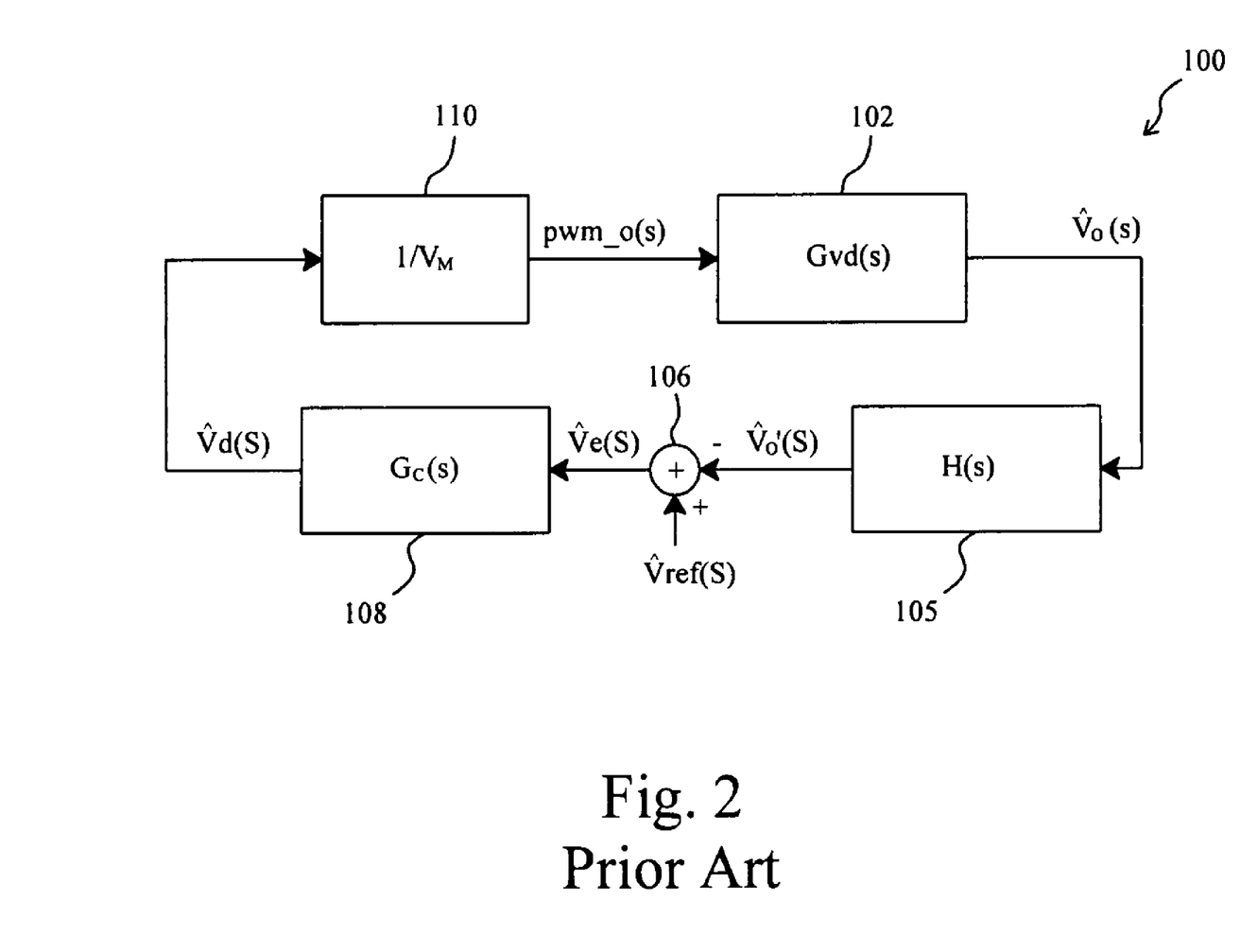
FIG. 2 is a small-signal model of the switching mode power supply in FIG. 1.

Generally speaking, the compensator 108 for the switching mode power supply 100 is designed based on the small signal modeling of the switching mode power supply 100. The continuous-time transfer function of each circuit can be derived from the small signal analysis and Laplace transformation as shown in FIG. 2, in which the pre-filter 105 has the transfer function H(s) to transform the output voltage $\hat{V}o(s)$ into the voltage $\hat{V}o'(s)=H(s)\times\hat{V}o(s)$, the error amplifier 106 compares the voltage $\hat{V}o'(s)$ with a reference voltage $\hat{V}ref(s)$ to generate the error signal $\hat{V}e(s)$, the compensator 108 has the transfer function Gc(s) to compensate the error signal $\hat{V}e(s)$ to generate the signal $\hat{V}d(s)$, the pulse width modulator 110 has the transfer function $1/V_M$ to transform the signal $\hat{V}d(s)$ into the PWM signal pwm_o(s), and the output stage 102 has the transfer function Gvd(s) of the so-called control-to-output voltage to transform the PWM signal pwm_o(s) into the output voltage $\hat{V}o(s)$. From the system shown in FIG. 2, the switching mode power supply 100 obviously has the open-loop gain $$T(s)=Gvd(s)\times Gc(s)\times H(s)/V_M. \quad [\text{Eq-1}]$$

Further, the continuous-time transfer function of the output stage 102 is $$\begin{aligned}Gvd(s) &= \hat{V}o(s)/pwm\_o(s) \quad [\text{Eq-2}]\\ &= \frac{(RoRcCs+Ro)Vi}{LC(Rc+Ro)s^2+[L+(RoRc+RcR_L+RoR_L)C]s+(R_L+Ro)}\\ &= (b_1s+b_0)/(a_2s^2+a_1s+a_0)\\ &= A[(s/\omega_{z1})+1]/\{[(s/\omega_{p1})+1][(s/\omega_{p2})+1]\},\end{aligned}$$

where $a_0, a_1, a_2, b_0, b_1$ and $A$ are constants, $\omega_{p1}$ and $\omega_{p2}$ are poles, $\omega_{z1}$ is a zero, $R_L$ is the equivalent DC resistance of the inductor L, Rc is the equivalent serial resistance of the capacitor C, and Ro is the resistance of the load 104. From the equation Eq-2, it can be obtained the poles $$\omega_{p1} = \frac{\frac{a_1}{a_2}+\sqrt{\left(\frac{a_1}{a_2}\right)^2-4\frac{a_0}{a_2}}}{2} \quad [\text{Eq-3}]$$

and $$\omega_{p2} = \frac{\frac{a_1}{a_2}-\sqrt{\left(\frac{a_1}{a_2}\right)^2-4\frac{a_0}{a_2}}}{2}, \quad [\text{Eq-4}]$$

the zero $$\omega_{z1}=b_0/b_1, \quad [\text{Eq-5}]$$

and the constant $$A=(b_0a_2)/(a_1a_0). \quad [\text{Eq-6}]$$

Figure 3:
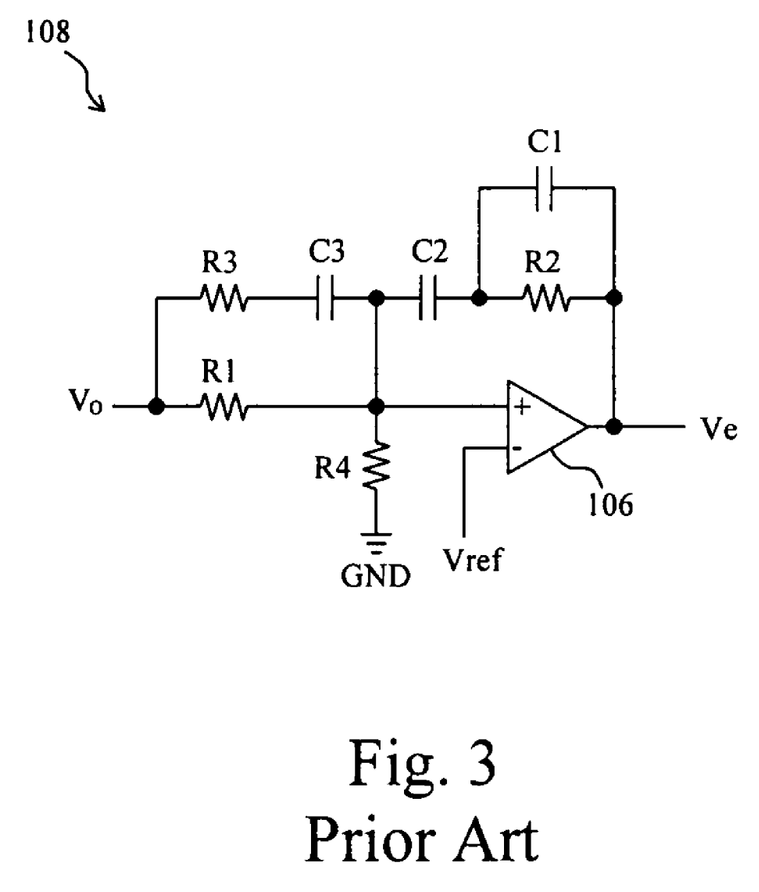
FIG. 3 is a schematic drawing showing a typical type-III analog compensator.

The compensator 108 is so designed according to the transfer function Gvd(s) of the output stage 102 for the converter 100 to provide a stable output voltage and a fast load transient response. Currently, popular analog compensators include type-I, type-II and type-III, and FIG. 3 shows a typical type-III analog compensator 108 which includes resistors R1, R2, R3, and capacitors C1, C2, C3. From the circuit of FIG. 3, the analog compensator 108 has the continuous-time transfer function $$\begin{aligned}Gc(s) &= \frac{(1+sR1C2)[1+s(R3+R1)C3]}{sR1(1+sC3R3)(C1+C2+sR2C1C2)} \quad [\text{Eq-7}]\\ &= Ac\frac{(1+s/\omega_{cz1})(1+s/\omega_{cz2})}{s(1+s/\omega_{cp1})(1+s/\omega_{cp2})},\end{aligned}$$

where Ac is a gain constant, $\omega_{cz1}$ and $\omega_{cz2}$ are zeros, and $\omega_{cp1}$ and $\omega_{cp2}$ are poles. In the equation Eq-7, the poles $\omega_{cp1}$ and $\omega_{cp2}$ are real poles for suppressing high-frequency noises. A good compensator 108 must eliminate the poles in the denominator of the transfer function Gvd(s) of the output stage 102. However, due to the inductor L and the output capacitor C, the transfer function Gvd(s) usually includes complex conjugated pole pair or a right hand zero (RHZ). For example, when $$\left(\frac{a_1}{a_2}\right)^2 < 4\frac{a_0}{a_2}$$

in the equations Eq-3 and Eq-4, the poles $\omega_{p1}$ and $\omega_{p2}$ become complex conjugated pole pair. As shown in the equation Eq-7, the poles $\omega_{cp1}$ and $\omega_{cp2}$ of the analog compensator 108 are $$\frac{1}{C3R3} \text{ and } \frac{1}{R2C1C2},$$

respectively. Since R2, R3, C1, C2 and C3 are all real, the poles $\omega_{p1}$ and $\omega_{p2}$ are real and thus cannot produce a complex number. As a result, the complex conjugated pole pair in the transfer function Gvd(s) of the output stage 102 will not be eliminated. In other words, the traditional compensator 108 can only eliminate the magnitude term of the complex conjugated pole pair so as to compensate the gain, but cannot compensate the phase angle correctly, which will reduce the bandwidth and the phase margin of the switching mode power supply. In addition, current digital compensators only compensate the magnitude term of the complex conjugated pole pair.

For more information of analog compensators, readers are referred to R. W. Erickon and D. Maksimoric, "Fundamentals of Power Electronics", Kluwer Academic Publisher, 2001. For more information of digital compensators, readers are referred to D. Maksimovic, R. Zane and R. Erickson, "Impact of Digital Control in Power Electronics", Proceeding of 2004 International Symposium on Power Semiconductor Devices & Ics, pp. 13-22, and Shamim Choudhury, "Designing a TMS320F280x Based Digitally Controlled DC-DC Switching Power Supply", Texas Instruments Application Report, SPRAAB3, July, 2005.

For further details, a unit gain single pole system is taken as an example which has the transfer function $$I(s)=1/[1+(s/\omega_p)]. \quad [\text{Eq-8}]$$

Figure 4:
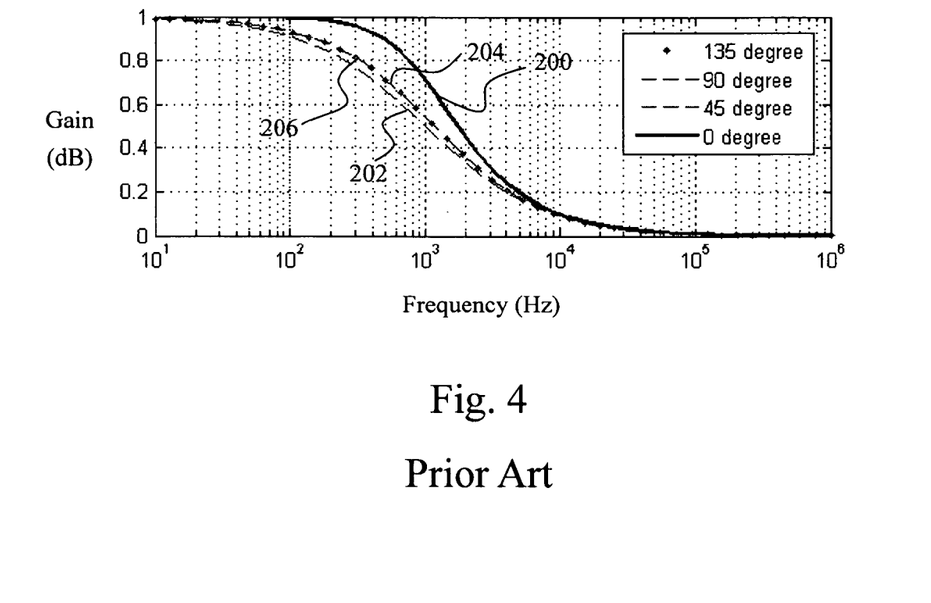
FIG. 4 is a diagram showing the frequency response of a unit gain single pole system at different phase angles.
Figure 5:
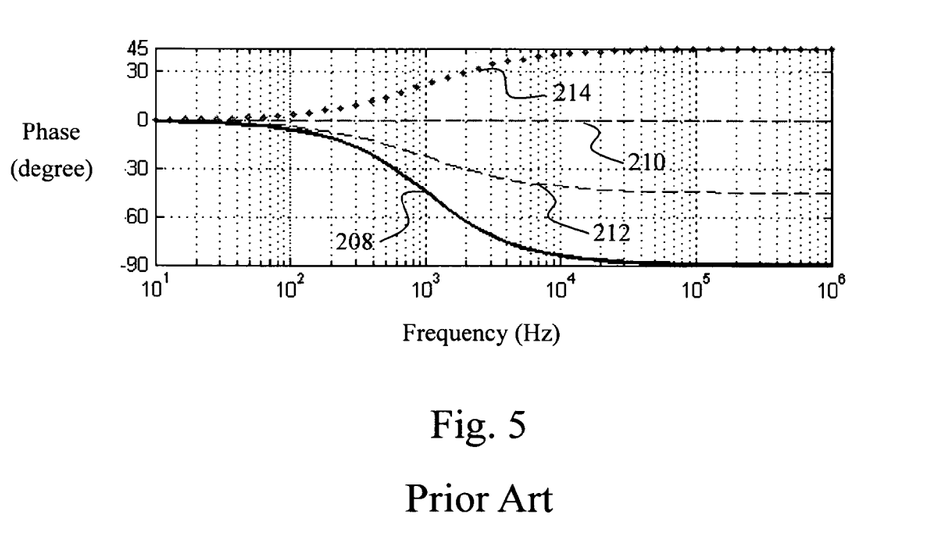
FIG. 5 is a diagram showing the phase frequency response of a unit gain single pole system at different phase angles.

The equation Eq-8 means that the system has a pole at the angular frequency $\omega_p$, and the pole $$\omega_p = \omega_{p0} e^{j\theta} = \omega_{p0}(\cos\theta + j\sin\theta), \quad [\text{Eq-9}]$$

where $\omega_{p0}$ is the magnitude of the pole $\omega_p$, and $\theta$ is the phase angle of the pole $\omega_p$. From the equation Eq-9, when $\sin\theta=0$, for example $\theta=N\times 180$, where N is an integer, $\omega_p$ is a real pole. When $\sin\theta\neq 0$, $\omega_p$ is a complex pole. Obviously, even having a same magnitude $\omega_{p0}$, the complex pole $\omega_p$ will have different frequency response with different phase angles $\theta$. FIGS. 4 and 5 show the frequency response of the unit gain single pole system at different phase angles. In FIG. 4, X-axis represents the frequency, Y-axis represents the gain, curve 200 represents the gain when the phase angle $\theta$ of the system is zero, curve 202 represents the gain when the phase angle $\theta$ of the system is 45 degrees, curve 204 represents the gain when the phase angle $\theta$ of the system is 90 degrees, and curve 206 represent the gain when the phase angle $\theta$ of the system is 135 degrees. In FIG. 5, X-axis represents the frequency, Y-axis represents the phase, curve 208 represents the phase when the phase angle $\theta$ of the system is zero, curve 210 represents the phase when the phase angle $\theta$ of the system is 45 degrees, curve 212 represents the phase when the phase angle $\theta$ of the system is 90 degrees, and curve 214 represents the phase when the phase angle $\theta$ of the system is 135 degrees. Let $\omega_{p0}=2\pi\times 1000$ and $\theta=0$, the unit gain single pole system has the transfer function $$I(s)=1/[1+(s/(2\pi\times 1000))]. \quad [\text{Eq-10}]$$

This means that when the pole is at the frequency 1,000 Hz, as shown by the curve 200 in FIG. 4, the unit gain single pole system is a real pole system. When the frequency is higher than 10 KHz, the phase of the system is close to −90 degrees, as shown by the curve 208 in FIG. 5. However, if the pole $\omega_p$ has a non-zero phase angle, for example 45 degrees, the transfer function of the system will become $$I(s) = 1/[1+(s/(2\pi\times 1000 e^{i\pi/4}))] \quad [\text{Eq-11}]$$
$$= 1/[1+(s/(2\pi\times 1000(0.7071+0.7071i)))].$$

Figure 6:
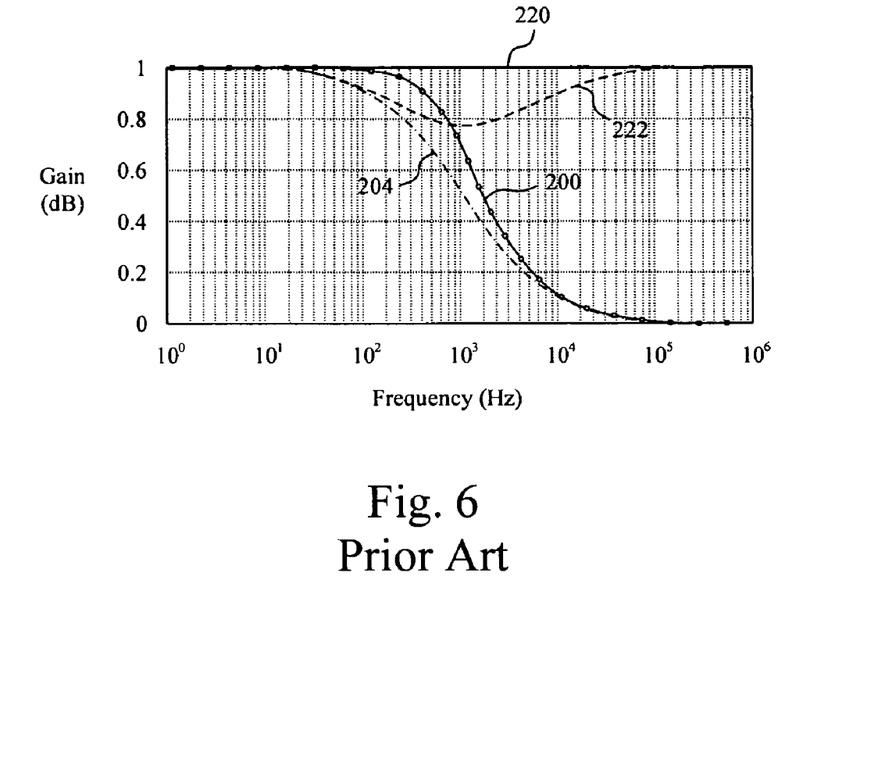
FIG. 6 is a diagram showing the variation of gain when perfectly and imperfectly compensating the complex conjugated pole pair of a system.
Figure 7:
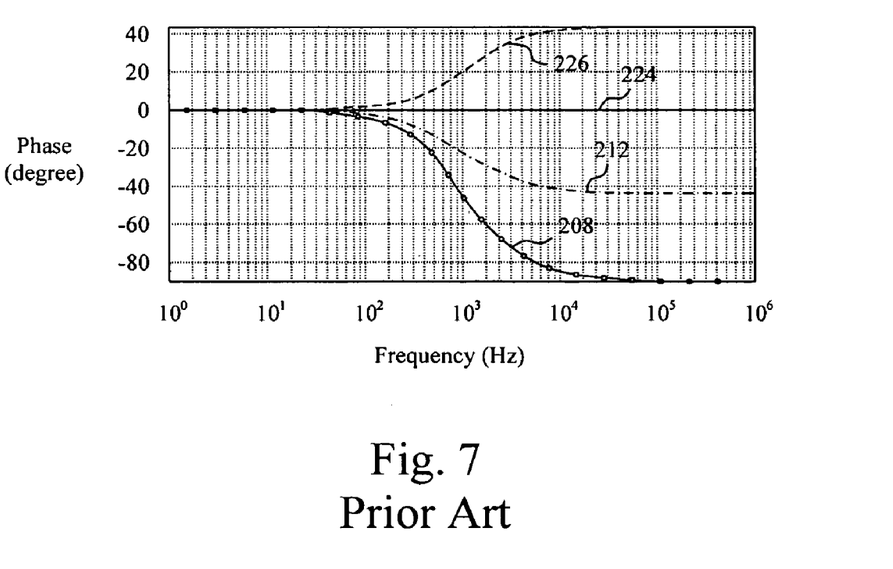
FIG. 7 is a diagram showing the variation of phase angle when perfectly and imperfectly compensating the complex conjugated pole pair of a system.

From the equation Eq-11, as the system has an imaginary number $2\pi\times 1000\times 0.7071i$, the phase of the system is close to −45 degrees when the frequency is over 10 KHz. As shown by the curve 212 in FIG. 5, it is obvious that the phase of the system is close to −45 degrees at high frequencies, but not close to 90 degrees as the situation when the system is at a single real pole. FIGS. 6 and 7 show the difference between a perfect and an imperfect compensated system. In FIG. 6, X-axis represents the frequency, Y-axis represents the gain, curves 200 and 204 are the gain when the phase angle $\theta$ is zero and 45 degrees, respectively, curve 220 represents the gain after the pole of the system is perfect compensated, and curve 222 represents the gain after the complex pole is compensated by a real zero. In FIG. 7, X-axis represents the frequency, Y-axis represents the phase, curves 208 and 212 are the phase when the phase angle $\theta$ is zero and 45 degrees, respectively, curve 224 represents the phase after the pole of the system is perfect compensated, and curve 226 represents the phase after the complex pole is compensated by a real zero. When the system has a single pole, if there is a compensator C(s) which can provide only one real zero, for example $C(s)=(1+s/(2\pi\times 1000))$, this compensator will compensate a real pole system to have the ideal characteristic of the gain equal to 1 and the phase equal to 0 as indicated by the equation Eq-10, as shown by the curves 220 and 224 in FIGS. 6 and 7. However, when a system having complex conjugated pole pair as the equation Eq-11 indicates is compensated by the compensator C(s), it is obtained $$I(s)\cdot C(s) = \frac{1+\dfrac{s}{2\pi\times 1000}}{1+\dfrac{s}{2\pi\times 1000 e^{\frac{i\pi}{4}}}}. \quad [\text{Eq-12}]$$

The frequency response is shown by the curves 222 and 226 in FIGS. 6 and 7, and the system has the non-ideal characteristic of the gain not equal to 1 and the phase not equal to 0.

Therefore, there is a need of a compensator for eliminating the complex conjugated pole pair of a switching mode power supply.

SUMMARY OF THE INVENTION

One object of the present invention is to provide a digital compensator for a switching mode power supply. The compensator eliminates the complex conjugated pole pair in the transfer function of the control-to-output voltage of the switching mode power supply.

Another object of the present invention is to provide a method for designing a digital compensator for a switching mode power supply to eliminate the complex conjugated pole pair in the transfer function of the control-to-output voltage of the switching mode power supply.

According to the present invention, a switching mode power supply includes an output stage of a continuous-time transfer function, and a digital compensator is so design that complex conjugated zero pair or a right hand pole are provided to eliminate the complex conjugated pole pair or right hand zero in the continuous-time transfer function. In a method for design the digital compensator, it is first determined a second continuous-time transfer function having complex conjugated zero pair equal to the complex conjugated pole pair of the first continuous-time transfer function, then the second continuous-time transfer function is transformed to a discrete-time domain (z domain), and the transfer function in the discrete-time domain is used to complete the digital compensator design. Even if the second continuous-time transfer function has complex conjugated zero pair, the coefficients of the discrete-time transfer function will be real numbers after the second continuous-time transfer function is transformed into z domain. Therefore, a digital compensator for eliminating the complex conjugated pole pair in the first continuous-time transfer function is obtained accordingly.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 8:
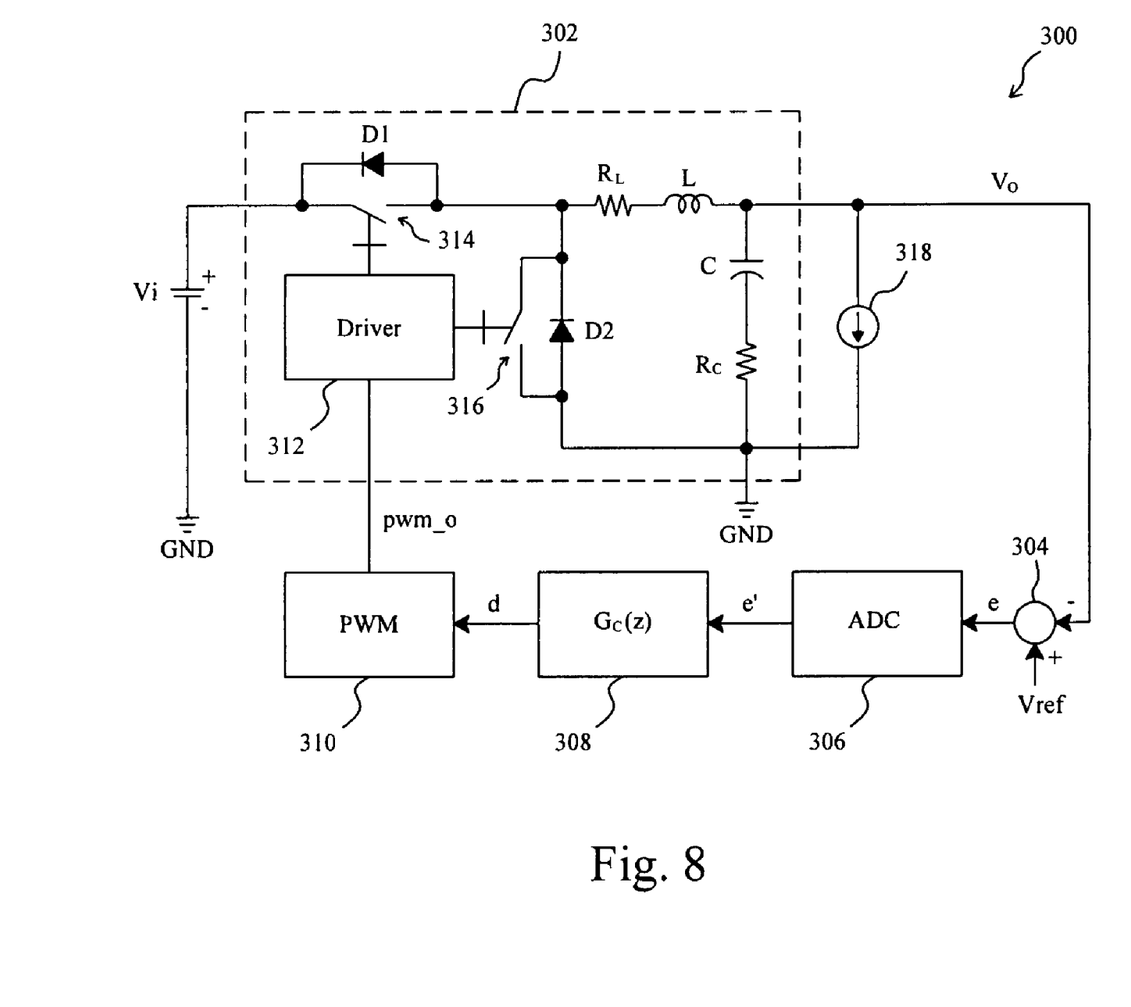
FIG. 8 is a schematic drawing showing a digital switching mode power supply according to one embodiment of the present invention.

FIG. 8 shows a digital switching mode power supply 300, in which an output stage 302 converts an input voltage Vi to an output voltage Vo for a load 318 according to a PWM signal pwm_o, an error amplifier 304 compares the output voltage Vo with a reference voltage Vref to generate an error signal e, an Analog-to-Digital Converter (ADC) 306 transforms the analog error signal e into a digital error signal e', a digital compensator 308 compensates the error signal e' to generate a signal d, and a digital pulse width modulator 310 generates a PWM signal pwm_o according to the signal d. The output stage 302 include switches 314 and 316 connected in series between the power input Vi and ground GND, and a driver 312 to switch the switches 314 and 316 according to the PWM signal pwm_o to generate the output voltage Vo.

The continuous-time transfer function Gvd(s) of the output stage 302 is shown as in the equation Eq-2, and the continuous-time transfer function Gc(s) of the compensator 308 is shown as in the equation Eq-7. By setting the zeros $\omega_{cz1}$ and $\omega_{cz2}$ in the equation Eq-7 equal to the poles $\omega_{p1}$ and $\omega_{p2}$ in the equation Eq-2 respectively, the equation Eq-7 can be rewritten as $$Gc(s) = \frac{Ac(a_2 s^2 + a_1 s + a_0)}{s(1 + s/\omega_{cp1})(1 + s/\omega_{cp2})}. \quad [\text{Eq-13}]$$

The transfer function Gc(s) in s domain is then transformed into a discrete-time transfer function Gc(z) in z domain by a bilinear transform. Let $$s = (2/T_s)(z-1)/(z+1), \quad [\text{Eq-14}]$$

where Ts is the sampling frequency. By substituting the equation Eq-14 into the equation Eq-13, it is obtained the discrete-time transfer function $$Gc(z) = \frac{Acz(b_{3z}z^{-3} + b_{2z}z^{-2} + b_{1z}z^{-1} + b_{0z})}{(a_{3z}z^{-3} + a_{2z}z^{-2} + a_{1z}z^{-1} + a_{0z})}, \quad [\text{Eq-15}]$$

where $$Acz = Ac \times T_s \times a_0 \times \omega_{cp1} \times \omega_{cp2}, \quad [\text{Eq-16}]$$

$$b_{3z} = T_s^2 a_0 - 2T_s a_1 + 4a_2, \quad [\text{Eq-17}]$$

$$b_{2z} = 3T_s^2 a_0 - 2T_s a_1 + 4a_2, \quad [\text{Eq-18}]$$

$$b_{1z} = 3T_s^2 a_0 + 2T_s a_1 + 4a_2, \quad [\text{Eq-19}]$$

$$b_{0z} = T_s^2 a_0 + 2T_s a_1 + 4a_2, \quad [\text{Eq-20}]$$

$$a_{3z} = -2T_s^2 \omega_{cp1}\omega_{cp2} + 4T_s(\omega_{cp1} + \omega_{cp2}) - 8, \quad [\text{Eq-21}]$$

$$a_{2z} = -2T_s^2 \omega_{cp1}\omega_{cp2} - 4T_s(\omega_{cp1} + \omega_{cp2}) + 24, \quad [\text{Eq-22}]$$

$$a_{1z} = 2T_s^2 \omega_{cp1}\omega_{cp2} - 4T_s(\omega_{cp1} + \omega_{cp2}) - 24, \quad [\text{Eq-23}]$$

$$a_{0z} = 2T_s^2 \omega_{cp1}\omega_{cp2} + 4T_s(\omega_{cp1} + \omega_{cp2}) + 8. \quad [\text{Eq-24}]$$

As shown from the equations Eq-16 to Eq-24, all coefficients in the transfer function Gc(z) are real numbers after the z domain transformation, and therefore it can be implemented in second or higher order Infinite Impulse Response (IIR) digital compensators. By properly selecting the coefficients of the second or higher order IIR digital compensators, complex conjugated zero pair or a right hand pole can be produced to eliminate the complex conjugated pole pair or right hand zero of the output stage 302, so as to make the gain and phase of the open-loop frequency response of the switching mode power supply 300 flatter around the complex conjugated pole pair or right hand zero. Because the digital compensator 308 can eliminate the complex conjugated pole pair, the open-loop gain of the switching mode power supply can be obtained from the equations Eq-2 and Eq-7 as $$T = Gvd(s)Gc(s) = \frac{AAc\left(\frac{s}{\omega_{z1}} + 1\right)}{s\left(\frac{s}{\omega_{cp1}} + 1\right)\left(\frac{s}{\omega_{cp2}} + 1\right)}. \quad [\text{Eq-25}]$$

Figure 9:
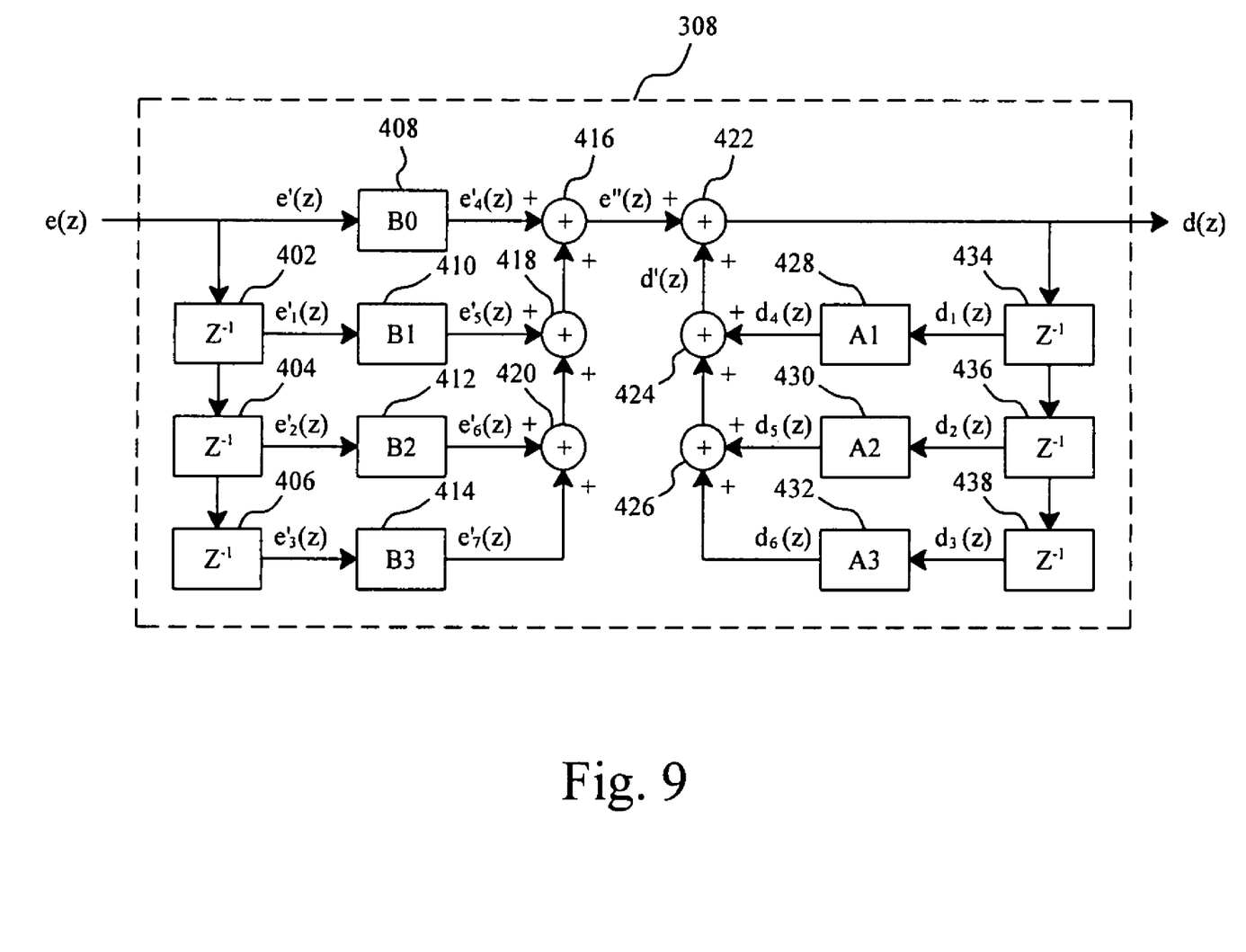
FIG. 9 is a schematic drawing showing a 3rd-order IIR digital compensator.

Referring to the equation Eq-15, in this embodiment, the transfer function Gc(z) obtained is of 3rd-order and can be implemented by a 3rd-order IIR digital compensator 308 as shown in FIG. 9. In the compensator 308, a register 402 stores a current error signal e'(z) and outputs a previous error signal $e'_1(z)$ stored in the register 402, a register 404 stores the error signal $e'_1(z)$ and outputs a previous error signal $e'_2(z)$ stored in the register 404, a register 406 stores the error signal $e'_2(z)$ and outputs a previous error signal $e'_3(z)$ stored in the register 406, a gain circuit 408 outputs a signal $e'_4(z)$ by multiplying the error signal $e'(z)$ with a coefficient B0, a gain circuit 410 outputs a signal $e'_5(z)$ by multiplying the error signal $e'_1(z)$ with a coefficient B1, a gain circuit 412 outputs a signal $e'_6(z)$ by multiplying the error signal $e'_2(z)$ with a coefficient B2, a gain circuit 414 outputs a signal $e'_7(z)$ by multiplying the error signal $e'_3(z)$ with a coefficient B3, adders 416, 418 and 420 combine the signals $e'_4(z)$, $e'_5(z)$, $e'_6(z)$ and $e'_7(z)$ to generate a signal $e''(z)$, a register 434 stores the signal $d(z)$ and outputs a previous signal $d_1(z)$ stored in the register 434, a register 436 stores the signal $d_1(z)$ and outputs a previous signal $d_2(z)$ stored in the register 436, a register 438 stores the signal $d_2(z)$ and outputs a previous signal $d_3(z)$ stored in the register 438, a gain circuit 428 outputs a signal $d_4(z)$ by multiplying the signal $d_1(z)$ with a coefficient A1, a gain circuit 430 outputs a signal $d_5(z)$ by multiplying the signal $d_2(z)$ with a coefficient A2, a gain circuit 432 outputs a signal $d_6(z)$ by multiplying the signal $d_3(z)$ with a coefficient A3, adders 424 and 426 combine the signals $d_4(Z)$, $d_5(z)$ and $d_6(z)$ to generate a signal $d'(z)$, and adder 422 combines the signals $e''(z)$ and $d'(z)$ to generate a signal $d(z)$.

Figure 10:
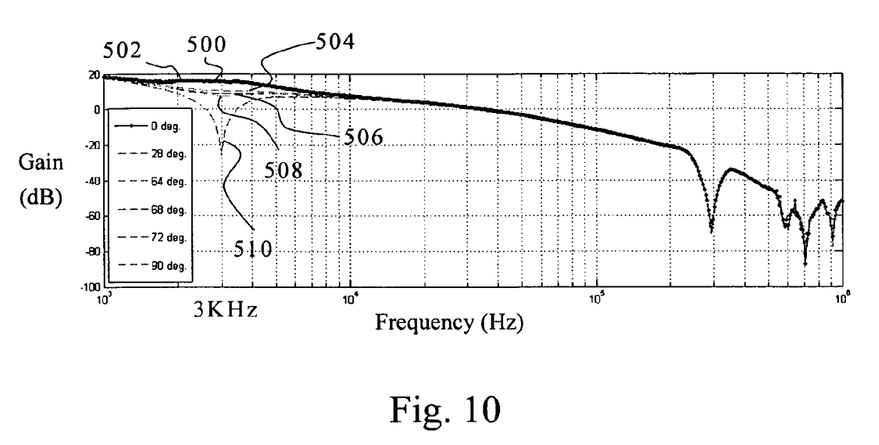
FIG. 10 is a diagram showing the frequency response of the open-loop gain of the digital switching mode power supply of FIG. 8 at different phase angles.
Figure 11:
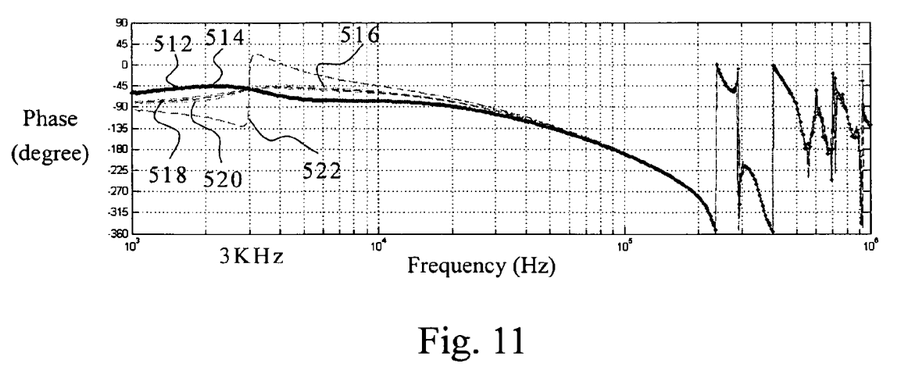
FIG. 11 is a diagram showing the frequency response of the open-loop gain of the digital switching mode power supply of FIG. 8 at different phase angles.

FIGS. 10 and 11 are diagrams showing the frequency response of the open-loop gain of the digital switching mode power supply 300 at different phase angles. In FIG. 10, X-axis represents the frequency, Y-axis represents the gain, curve 500 represents the gain of the converter 300 when the phase angle θ is 0, curve 502 represents the gain of the converter 300 when the phase angle θ is 28 degrees, curve 504 represents the gain of the converter 300 when the phase angle θ is 64 degrees, curve 506 represents the gain of the converter 300 when the phase angle θ is 68 degrees, curve 508 represents the gain of the converter 300 when the phase angle θ is 72 degrees, and curve 510 represents the gain of the converter 300 when the phase angle θ is 90 degrees. In FIG. 11, X-axis represents the frequency, Y-axis represents the phase, curve 512 represents the phase of the converter 300 when the phase angle θ is zero, curve 514 represents the phase of the converter 300 when the phase angle θ is 28 degrees, curve 516 represents the phase of the converter 300 when the phase angle θ is 64 degrees, curve 518 represents the phase of the converter 300 when the phase angle θ is 68 degrees, curve 520 represents the phase of the converter 300 when the phase angle θ is 72 degrees, and curve 522 represents the phase of the converter 300 when the phase angle θ is 90 degrees. From FIGS. 10 and 11, the compensated complex conjugated zero is at 3 KHz, and the gain and phase of the open-loop gain change with different complex conjugated zero, wherein the complex conjugated zero change with the coefficients of the digital compensator 308. As shown in FIGS. 10 and 11, the compensator 308 designed according to the present invention can compensate the gain and phase angle of the open-loop gain of the switching mode power supply 300 for increasing the phase margin, and improve the bandwidth, stability and transient response of the switching mode power supply 300.

Figure 12:
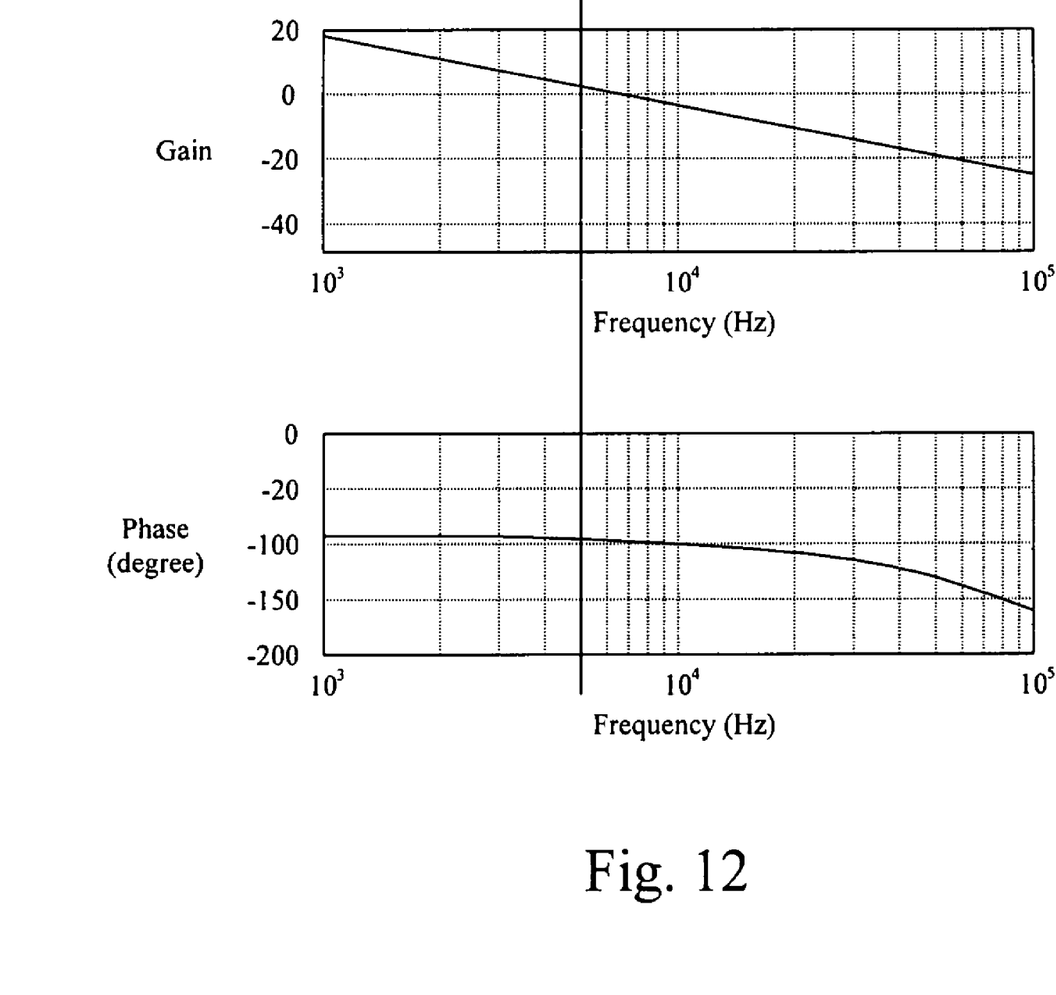
FIG. 12 is a diagram showing the open-loop frequency response of a buck converter with same parameters after being compensated by complex conjugated zero pair.
Figure 13:
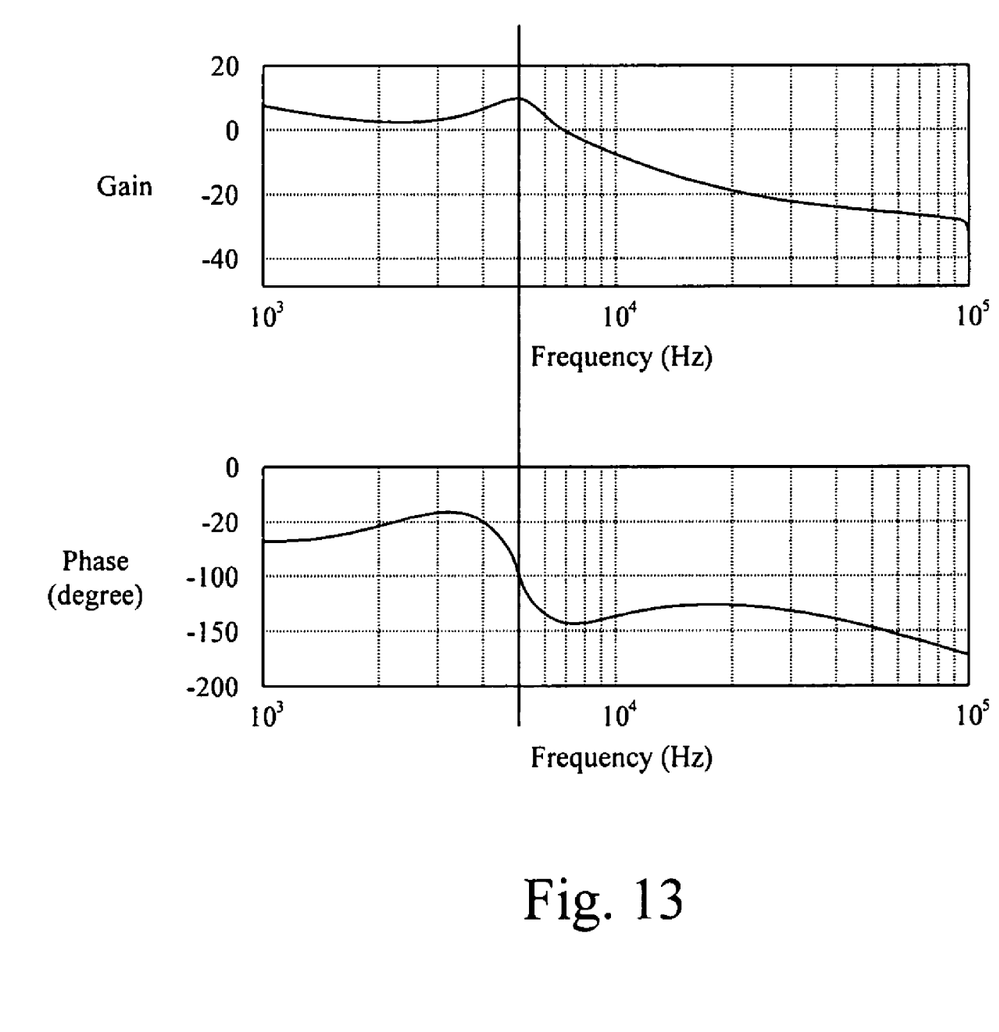
FIG. 13 is a diagram showing the open-loop frequency response of a buck converter with same parameters after being compensated by a real zero.

FIGS. 12 and 13 are diagrams showing the open-loop frequency response of a buck converter with same parameters after being compensated by complex conjugated zero and a real zero, respectively. In this embodiment, the complex conjugated zero of the buck converter is at 5 KHz. From FIGS. 12 and 13, the frequency response obtained by compensating with complex conjugated zero has a phase angle change smaller than 20 degrees around the pole, even no change. The frequency response obtained by compensating with real zero has a phase angle change larger than 20 degrees, even reaching 180 degrees. Thus, a better frequency response can be obtained by compensating with complex conjugated zero.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for designing a digital compensator for a switching mode power supply which includes an output stage of a first continuous-time transfer function having complex conjugated pole pair therein, the method comprising the steps of:
   determining a second continuous-time transfer function having complex conjugated zero pair equal to the complex conjugated pole pair of the first continuous-time transfer function;
   transforming the second continuous-time transfer function into a discrete-time transfer function; and
   completing the digital compensator design by using the discrete-time transfer function.

2. The method of claim 1, wherein the output stage comprises at least an inductor, a capacitor and a power transistor configured to constitute the first continuous-time transfer function.

3. The method of claim 1, wherein the step of transforming the second continuous-time transfer function into a discrete-time transfer function comprises a bilinear transform.

4. The method of claim 1, wherein the digital compensator is a finite impulse response digital compensator or an infinite impulse response digital compensator.

5. A digital compensator for a switching mode power supply which includes an output stage of a continuous-time transfer function having complex conjugated pole pair therein, the digital compensator comprising:
   a circuit of a discrete-time transfer function which has an equivalent continuous-time transfer function having complex conjugated zero pair equal to the complex conjugated pole pair;
   whereby an open-loop frequency response of the switching mode power supply at the complex conjugated pole pair has a phase angle change less than 20 degrees.

6. The digital compensator of claim 5, wherein the discrete-time transfer function is transformed from the equivalent continuous-time transfer function by a bilinear transform.

* * * * *